United States Patent [19]

Ishizaka

[11] Patent Number: 5,034,805
[45] Date of Patent: Jul. 23, 1991

[54] COLOR SEPARATION APPARATUS
[75] Inventor: Kunimasa Ishizaka, Osaka, Japan
[73] Assignee: NEC Home Electronics Ltd., Osaka, Japan
[21] Appl. No.: 429,376
[22] Filed: Oct. 31, 1989
[30] Foreign Application Priority Data Oct. 31, 1988 [JP] Japan .................. 63-275737

[51] Int. Cl.$^5$ .............................................. H04N 9/07
[52] U.S. Cl. .................................. 358/44; 358/41; 358/43
[58] Field of Search .................. 388/41, 42, 43, 44, 388/166, 167, 75, 36

[56] References Cited

U.S. PATENT DOCUMENTS

| | | | |
|---|---|---|---|
| 4,157,566 | 6/1979 | Nakabe et al. | 358/44 |
| 4,701,784 | 10/1987 | Matsuoka et al. | 358/44 |
| 4,760,441 | 7/1988 | Kohno | 358/44 |

FOREIGN PATENT DOCUMENTS

| | | |
|---|---|---|
| 0011088 | 1/1984 | Japan . |
| 0161888 | 7/1986 | Japan . |
| 0234986 | 10/1987 | Japan . |
| 0182986 | 7/1988 | Japan . |
| 0314088 | 12/1988 | Japan . |

Primary Examiner—Howard W. Britton
Assistant Examiner—Michael H. Lee
Attorney, Agent, or Firm—Cushman, Darby & Cushman

[57] ABSTRACT

A color separation circuit arrangment for separating color components from an image sensor that outputs two kinds of photoelectric conversion signals with different color components for each horizontal scanning line. Color separation is carried out by causing color separation arithmetic means to perform color separation by supplying the arithmetic means with two kinds of photoelectric conversion signals for read unit regions that are formed adjacently on the same horizontal scanning line, output by the image sensors. The color separation apparatus includes signal averaging means for evaluating the average of a plurality of photoelectric conversion signals of at least one kind out of the two kinds of photoelectric conversion signals from the read unit regions provided adjacently on the same horizontal scanning line, and supplying the result of the evaluation to the color separation arithmetic means.

12 Claims, 4 Drawing Sheets

| COMPARATOR OUTPUT C1 | COMPARATOR OUTPUT C2 | COEFFICIENT K |
|---|---|---|
| L | H | 1/4 |
| L | L | 0 |
| H | L | -1/4 |

COLOR SEPARATION APPARATUS

BACKGROUND OF THE INVENTION

1. Field of the Invention

The present invention relates to a color separation circuit arrangement, and more particularly to a circuit arrangement for separating a color component from an image signal produced by a single plate CCD image sensor.

2. Description of Related Art

There is known a frame storage system and field storage system as color filter arrangement system of a color difference sequential system for a single plate CCD image sensor. An arrangement according to the field storage system as shown in FIG. 1 is well known and used more frequently than an arrangement according to the frame storage system in order to overcome the "after-image" problem of the frame storage system.

Figure 1:
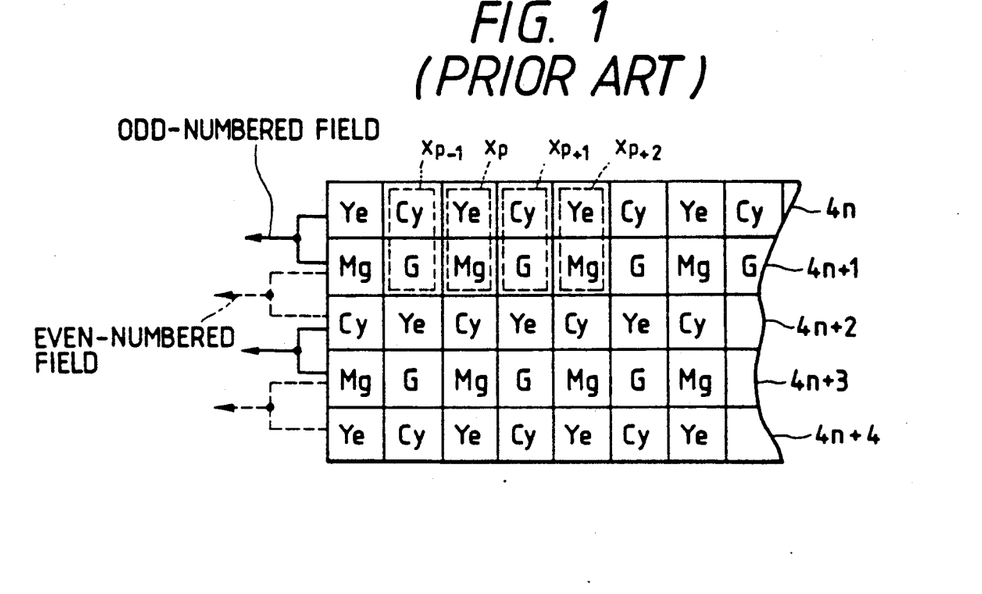
FIG. 1 (PRIOR ART) is a plan view showing a conventional arrangement of color filters of CCD image sensors.

FIG. 1 (PRIOR ART) is a plan view showing a conventional arrangement in the prior art of color filters of CCD image sensors. In FIG. 1 (PRIOR ART), for example, color filters Ye (yellow), Cy (cyan), Ye, Cy, ... may be sequentially arrayed from the left end for the pixels on the 4n-th (n is a natural integer) horizontal line; further, for example, color filters Mg (magenta), G (green), Mg, G, ... may be sequentially arrayed from the left end for the pixels on the (4n+1)-th horizontal line. Additionally, for example, color filters Cy, Ye, Cy, Ye, ... may be sequentially arrayed from the left end for the pixels on the (4n+2)-th horizontal line, and color filters Mg, G, Mg, G ... may be sequentially arrayed from the left end for the pixels on the (4n+3) th horizontal line.

For odd-numbered fields, photoelectric conversion signals (Ye+Mg or Cy+G) are extracted simultaneously from the 4n-th and the (4n+1)-th horizontal lines, and sequentially for the conversion signals, as signals pertaining to one horizontal scanning line; photoelectric conversion signals (CyMg or Ye+G) are then extracted simultaneously from the (4n+2)-th and the (4n+3)-th horizontal lines, and sequentially for the conversion signals, as signals pertaining to one horizontal scanning line, after which this extracting operation is repeated. On the other hand, for even-numbered fields, photoelectric conversion signals (Mg+Cy or G+Ye) are extracted simultaneously from the (4n+1)-th and the (4n+2)-th horizontal lines, and sequentially for the conversion signals, as signals pertaining to one horizontal scanning line; photoelectric conversion signals (Mg+Ye or G+Cy) are then extracted simultaneously from the (4n+3)-th and the (4n+4)-th horizontal lines, and sequentially for the conversion signals, after which this extracting operation is repeated.

According to such a filter arrangement, for odd-numbered fields, vertically adjacent two pairs of color filter regions of Ye and Mg, Cy and G, Cy and Mg, and Ye and G serve as extracting unit regions. For even-numbered fields, two pairs of color field regions Mg and Ye, G and Cy, Mg and Cy, and G and Ye serve as extracting unit regions.

The pairs of photoelectric conversion signals on the same vertical line and two horizontal lines thus extracted are summed to compose summed photoelectric conversion signals ... $X_{p-1}, X_{p+1}, X_{p+1}, ...$ which are applied to a color separation circuit. In this specification, the term "color separation apparatus" means an apparatus including an image sensor, and the term "color separation circuit" means a circuit excluding the image sensor. The color separation circuit separates red signal R or blue signal B alternately for every horizontal scanning line by appropriately executing prescribed color separation operations from summed photoelectric conversion signals of two vertical lines adjacent in horizontal direction, that is, summed photoelectric conversion signals, ..., $X_{p-1}$ and $X_p$, $X_p$ and $X_{p+1}$, ... having different color components from each other.

However, according to the conventional color separation apparatus, the separation operation is carried out based on the summed photoelectric conversion signals, ..., $X_{p-1}$ and $X_p$, $X_p$ and $X_{p+1}$, ..., for portions of two vertical lines adjacent in horizontal direction; as a result, a pseudo color is generated when an image contour falls on the boundary between the two adjacent vertical lines. Thus, the color component in the image signal cannot appropriately be separated due to the pseudo color.

Figure 2:
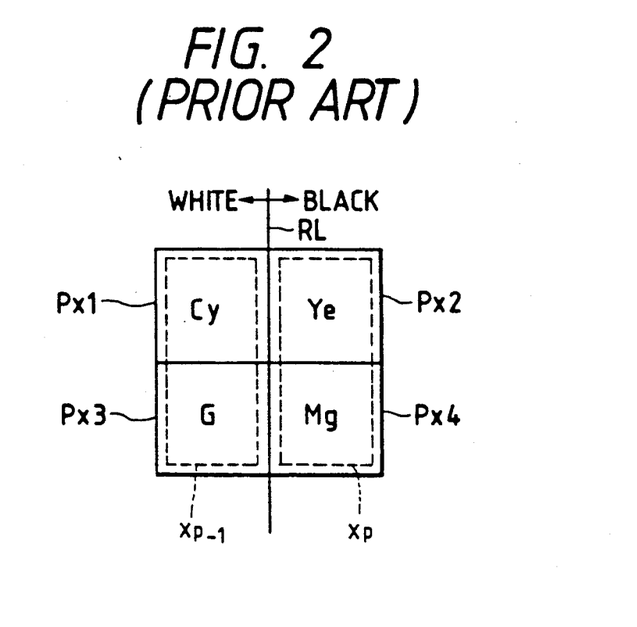
FIG. 2 (PRIOR ART) is a diagram illustrating the drawbacks of the conventional apparatus.

For example, in the case where a color separating operation is carried out with respect to summed photoelectric conversion signals $X_{p-1}$ (Cy+G) and $X_p$ (Ye+Mg) on four pixels $P_{x1}-P_{x4}$ as shown in FIG. 2, if the black-and-white contour RL of the image which is extending in the vertical direction passes on the center of these pixels, then the summed photoelectric conversion signal $X_{p-1}$ corresponds to white side of the contour while the other summed photoelectric conversion signal $X_p$ corresponds to black side, without employing a common color as the filtering target. As a result, a pseudo color is produced because the color separating operation cannot properly be carried out.

The pseudo color problem may also occur when the colors on the left-and-right side of a contour are different from black and white.

SUMMARY OF THE INVENTION

An object of the present invention is to provide a color separation circuit arrangement that overcomes the problem of pseudo color generated by the image contour extending vertically, and which improves the quality of a picture after the color separating operation.

According to a first embodiment of the invention, a color separation apparatus outputs photoelectric conversion signals having color components identical with each other. These signals are extracted from alternate extracting unit regions in the horizontal direction. The color separation apparatus is provided with an image sensor that outputs two photoelectric conversion signals different in color component with each other for each horizontal scanning line. These photoelectric conversion signals output from the image sensor are applied to signal averaging means. The signal averaging means evaluate the average of a plurality of photoelectric conversion signals of at least one of the two photoelectric conversion signals from the extracting unit regions provided adjacent on the same horizontal scanning line, and supply an output thereof to color separation arithmetic means. The color separation arithmetic means separates a color component from the two photoelectric conversion signals.

According to a second embodiment of the invention, a color separation apparatus outputs photoelectric conversion signals having color components identical with each other, the signals being extracted from alternate extracting unit regions in the horizontal direction. The color separation apparatus is provided with an image sensor that outputs two photoelectric conversion signals different in color components with each other for each horizontal scanning line. These photoelectric conversion signals output from the image sensor are applied to signal weighted averaging means. The signal weighted averaging means perform a weighed averaging of a plurality of photoelectric conversion signals of at least one of the two photoelectric conversion signals from the extracting unit regions provided adjacently on the same horizontal scanning line, and supply an output thereof to color separation arithmetic means. The color separation arithmetic means separate a color component from the two photoelectric conversion signals. Weighing value setting means vary the weighing value of the signal weighted averaging means by detecting the contour position of a received optical image based on the photoelectric conversion signals from the plurality of extracting unit regions.

Both of the first and second embodiments of the present invention provide color separation using an arithmetic means to operate on two different photoelectric conversion signals having color components different from each other output by the image sensors.

The first embodiment of the present invention employs an average signal of a plurality of photoelectric conversion signals extracted from the extracting unit regions provided adjacently on the same horizontal scanning line, the average signal being output by signal averaging means and supplied to the color separation arithmetic means as the photoelectric conversion signal of at least one of the photoelectric conversion signals.

As a result, since color separation can be properly performed even in the case where the color components are separated with respect to the photoelectric conversion signals in the vicinity of the image contour, the chance of an improper generation of a pseudo color is reduced.

In the second embodiment of the invention, signal output from the signal weighted averaging means is employed as the photoelectric conversion signal for at least one of the photoelectric conversion signals to be supplied to the color separation arithmetic means. The signal weighted averaging means varies the weighing coefficient by determining the weighted average of the plurality of photoelectric conversion signals from the extracting unit regions that are provided adjacent on the same horizontal scanning line. This variation in the weighing coefficient by the signal weighted averaging means is performed in response to contour position information on a received image detected and output by the weighing value setting means, and in response to the photoelectric conversion signals from the plurality of read unit regions. The signal weighted averaging means supplies its output to the color separation arithmetic means.

As a result, since the influence of the contour of an image is greatly reduced by the process of weighed average operation in accordance with the weighing coefficients in response to the contour position, the chance of an improper generation of a pseudo color can be greatly reduced even in the case where a color component is separated from the photoelectric conversion signals in the vicinity of the contour of the image.

BRIEF DESCRIPTION OF THE DRAWINGS

Preferred embodiment(s) of the invention will be described in detail with reference to the drawings wherein like reference numerals denote like or corresponding parts throughout.

DETAILED DESCRIPTION OF THE PREFERRED EMBODIMENTS

Figure 3:
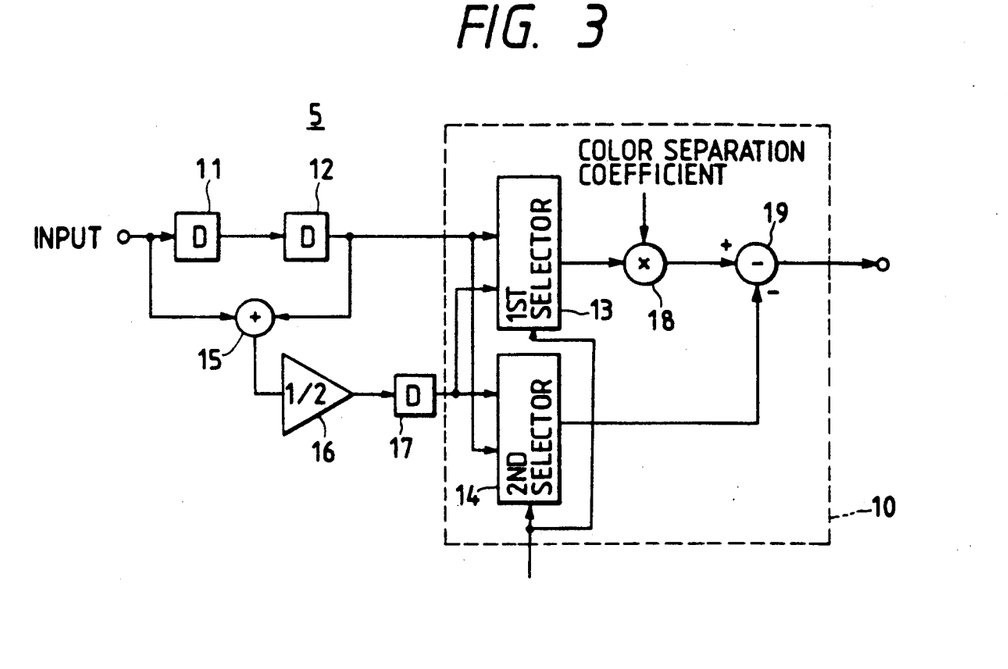
FIG. 3 is a schematic diagram showing a first embodiment of the color separation apparatus in accordance with the present invention.

FIG. 3 is a block diagram showing a color separating circuit according to a first embodiment of the invention.

In FIG. 3, summed photoelectric conversion signals, ..., $X_{p-1}$, $X$, $X_{p+1}$, $X_{p+2}$, ..., from an image sensor (not shown) in which the color filters are arrayed as shown in FIG. 1, are input into a color separation circuit 5. These input signals are supplied to a color separation arithmetic means 10. More specifically, the input signals are supplied to unit delay circuits 11 and 12 connected in cascade to each other, each of which delays a signal by a transfer time (referred to as time unit hereinafter) required for a transfer from one extracting unit region to the next extracting unit region. The summed photoelectric conversion signal that is delayed by two units of time is supplied to a first selector circuit 13 at a first selective input thereof and to a second selector circuit 14 at a second selective input thereof.

The input summed photoelectric conversion signal and a summed photoelectric conversion signal delayed by two time units are then supplied to an adder 15 to be summed together, and then an output of the adder 15 is multiplied by a factor of $\frac{1}{2}$ via a $\frac{1}{2}$ multiplier circuit 16. Thus, the average of the input summed photoelectric conversion signal and the summed photoelectric conversion signal delayed by two time units is evaluated by the adder circuit 15 and the $\frac{1}{2}$ multiplier circuit 16. After delayed by one unit of time via a unit time delaying circuit 17, the average value signal is supplied to the first selector circuit 13 at a second selective input thereof and to the second selector circuit 14 at a first selective input thereof.

Consequently, the summed photoelectric conversion signal $X_p$ and the average value signal of the preceding and the succeeding summed photoelectric conversion signals $X_{p-1}$ and $X_{p+1}$ are supplied as synchronized selective signals to the first and the second selector circuits 13 and 14, respectively. Further, as is clear from FIG. 1, the color components of these photoelectric conversion signals $X_{p-1}$ and $X_{p+1}$ are the same, though they differ from those of the summed photoelectric conversion signal $X_p$, so that their average value signal also has the same color components.

Further, a common selection switching signal is applied to the first and the second selector circuits 13 and 14. The selection switching signal inverts the logic level for every unit of time, having different starting logic level for the odd-numbered fields and even-numbered fields. The first selector circuit 13 selects the summed photoelectric conversion signal from the unit delay circuit 12 when the selection switching signal has logic "L (low)", and selects the averaged photoelectric conversion signal from a delay circuit 17 when the logic is an "H (high)". On the other hand, the second selector circuit 14 selects the averaged summed photoelectric conversion signal from the delay circuit 17 when the selection switching circuit has logic "L", and selects the summed photoelectric conversion signal from the delay circuit 12 when the logic is "H".

Accordingly, the first selector circuit 13 selects summed photoelectric conversion signals that contain the same color components (for example, Ye+Mg or Cy+Mg) throughout a horizontal scanning line, whereas the second selector circuit 14 selects summed photoelectric conversion signals that contain the same color components that are different from those of the first selector circuit 13 (for example, Cy+G or Ye+G) throughout a horizontal scanning line.

The summed photoelectric conversion signal via the first selector circuit 13 is supplied to a multiplier circuit 18 in which the summed photoelectric conversion signal is multiplied with a color separation coefficient. An output of the multiplier circuit 18 is supplied to a subtracter circuit 19. In this manner, the subtracter circuit 19 outputs a red signal R or a blue signal B alternately for the horizontal scanning line.

As shown in FIG. 3, the color separation arithmetic means 10 includes the first and the second selector circuits 13 and 14, the multiplier circuit 18 and the subtracter circuit 19.

Figure 4:
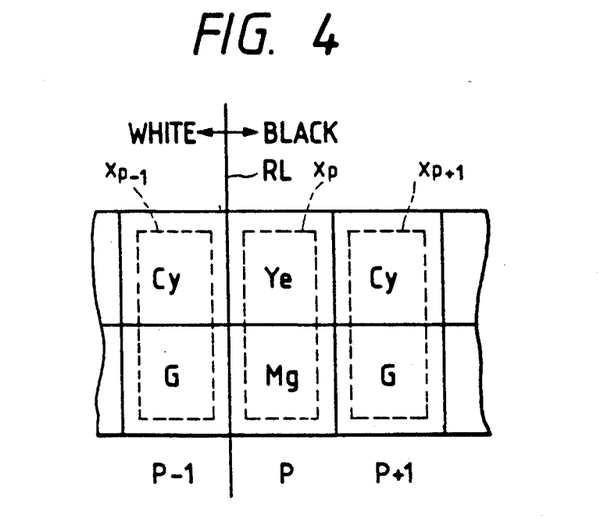
FIG. 4 is a diagram explaining the circuit arrangement shown in FIG. 3.

Therefore, in accordance with the above embodiment of the invention, the summed photoelectric conversion signal with one group of color components from the image sensors is employed for averaging the two summed photoelectric conversion signals extracted from two extracting unit regions which are apart from each other by two unit regions, instead of being employed directly for the operation of the color separation. As a result, an influence of the image contour mainly in the vertical direction is suppressed, thereby reducing the chances of generation of a pseudo color compared with the conventional apparatus. In other words, even when the contour RL is located as shown in FIG. 4, for example, as the summed photoelectric conversion signal for color components Cy+G to be employed for color separation, the average value of the summed photoelectric conversion signals $X_{p-1}$ and $X_{p+1}$ for the (p−1)-th and the (p+1)-th vertical lines is employed. Therefore, the difference of the average signal from the summed photoelectric conversion signal $X_p$ on the intermediate line between the signals $X_{p-1}$ and $X_{p+1}$ having color components Ye+Mg becomes smaller, and influence of a pseudo color is reduced accordingly.

Figure 5:
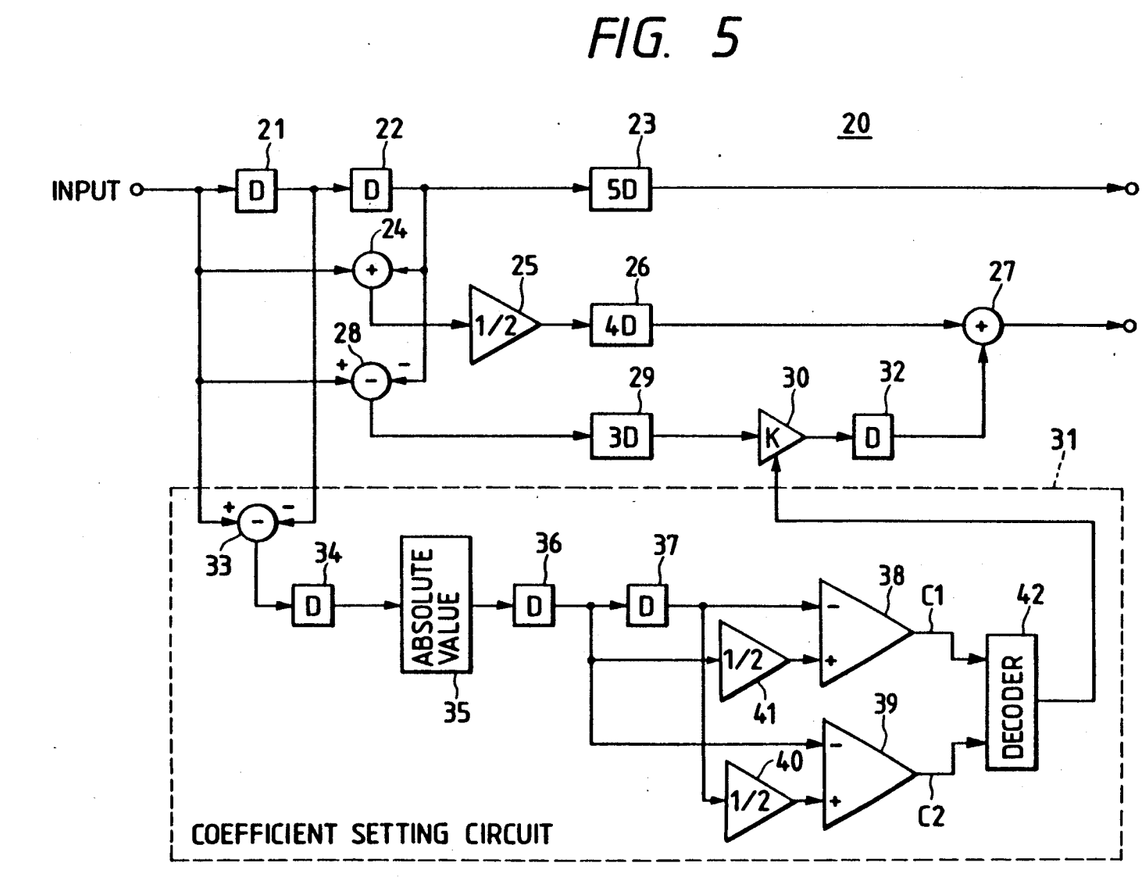
FIG. 5 is a block diagram showing a second embodiment of the present invention.

FIG. 5 shows a partial constitution of a second embodiment of the present invention. FIG. 5 shows only a part of the circuit shown in FIG. 3., which part contains circuits for forming summed photoelectric conversion signals to be supplied to the first and the second selector circuits 13 and 14.

In the second embodiment, the summed photoelectric conversion signal from one group of color components to be used for separating the color components is obtained by a weighed averaging in correspondence to the position of an image contour, rather than by simply averaging.

In FIG. 5, the summed photoelectric conversion signals, ..., $X_{p-1}$, $X_p$, $X_{p+1}$, $X_{p+2}$, ..., from image sensors with color sensors arranged as shown in FIG. 1, are input into a color separation circuit 20. These signals are applied to unit delay circuits 21 and 22 connected in cascade each of which delays signals by one unit of time. The summed photoelectric conversion signal that is delayed by two time units is delayed by five time units by a 5-unit delay circuit 23, and the signal thus delayed is supplied to the first selector circuit 13 at a first selective input thereof and to the second selector circuit 14 at a second selective input thereof.

The summed photoelectric conversion signals that precede and succeed the unit delay circuits 21 and 22 connected in cascade are summed in an adder circuit 24, multiplied by a factor of ½ by a ½ multiplying circuit 25 to be converted to an average value signal, delayed further by four time units by a 4-unit- delay circuit 26, and then supplied to an adder circuit 27.

Further, the summed photoelectric conversion signals preceding and succeeding the unit delay circuit 21 and 22 connected in cascade are supplied to a subtracter circuit 28, in which the original summed photoelectric conversion signal is subtracted by the summed photoelectric conversion signal which is two time units delayed. An output signal of the subtracter circuit 28 is supplied through a 3-unit delay circuit 29 by which the output signal is delayed by three time units to a variable coefficient device 30 by which the signal is multiplied by a weighing coefficient K preset by a coefficient setting circuit 31 described later. An output signal of the variable coefficient device 30 is delayed by one time unit by a unit delay circuit 32, and then supplied to the adder circuit 27.

The adder circuit 27 adds two incoming input signals, and outputs the summed signal to the first selector circuit 13 at a second selective input thereof and to the second selector circuit 14 at a first selective input thereof.

A value of the weighing coefficient K of the coefficient device 30 preset by the coefficient setting circuit 31 (described later) is appropriately selected from values ¼, ½ and −¼. Accordingly, in case of the timing for which the signal output by the 5-unit delay circuit 23 is the summed photoelectric conversion signal $X_p$, the adder circuit 27 outputs either one of $(X_{p-1})/4+(3\cdot X_{p+1})/4$, $(X_{p-1})/2+(X_{p+1})/2$ or $(3\cdot X_{p-1})/4+(X_{p+1})/4$.

Summed photoelectric conversion signals preceding and succeeding the unit delay circuit 21 are supplied to the coefficient setting circuit 31. In the coefficient setting circuit 31, the subtracter circuit 33 subtracts the succeeding signal from the preceding signal thereby producing a difference signal which is delayed by one unit of time by a unit delay circuit 34. An output signal of the unit delay circuit 34 is supplied to an absolute value circuit 35 which outputs an absolute value signal of the delayed difference signal. The absolute value signal produced by the circuit 35 is delayed by one time unit by a unit delay circuit 36. The absolute value signal thus delayed is supplied to a unit delay circuit 37 by which the output signal from the unit delay circuit 36 is further delayed by one time unit, thereby obtaining two absolute value signals which are different in time base by one time unit from each other. The absolute value signal preceding by one time unit on the time base, that is, the output signal of the unit delay circuit 37, is applied to an inverting input terminal of a first comparator circuit 38, and also applied to a non-inverting input terminal of a second comparator 39 through a ½ multiplying circuit 40 by which a the signal is multiplied by a factor of 1/2. On the other hand, the absolute value signal succeeding by one unit of time on the time base, that is, the output signal of the unit delay circuit 36, is applied to a non-inverting input terminal of the first comparator circuit 38 after being multiplied by a factor of ½ by a ½ multiplying circuit 41, and to an inverting input terminal of the second comparator circuit 39.

Figure 6:
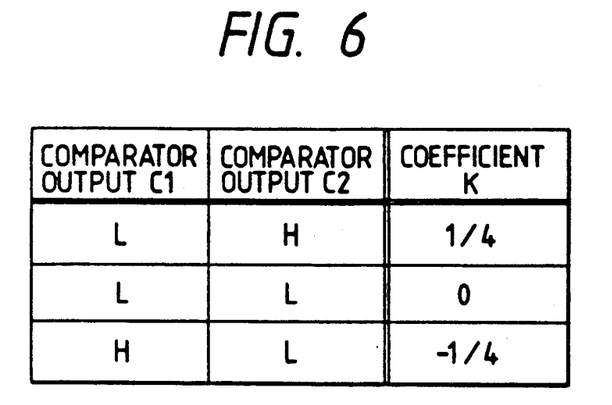
FIG. 6 is a chart showing the details of conversion of a decoder circuit of FIG. 5.

Output signals $C_1$ and $C_2$ of the first and second comparators 38 and 39, respectively, are supplied to a decoder circuit 42. The decoder circuit 42 determines the weighing coefficient K based on the comparator signals $C_1$ and $C_2$ in accordance with a parameter decoding table as shown in FIG. 6, and outputs the determined weighing coefficient signal K to the coefficient device 30. The decode processing requires one time unit and, accordingly, the decoder circuit 42 constitutes a unit delay circuit.

The decoding operation by the decoder circuit 42 is processed based on the following viewpoints.

Figure 7A:
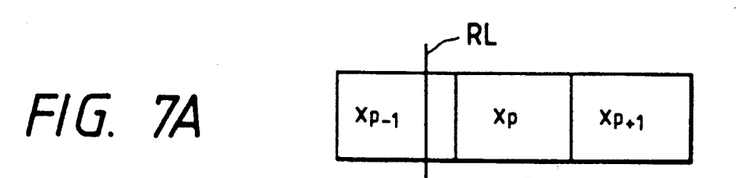
FIGS. 7A-7D are diagrams explaining the method of determination of the weighing coefficient.
Figure 7B:
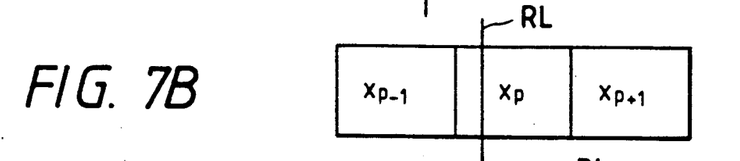

When the image contour RL is located between a position from about ¾ in the horizontal direction of a extracting unit region $R_1$ which outputs a first summed photoelectric conversion signal $X_{p-1}$ as shown in FIG. 7A and a position about ¼ in the horizontal direction of a extracting unit region $R_2$ which outputs a summed photoelectric conversion signal $X_p$ as shown in FIG. 7B, the difference between the summed photoelectric conversion signals $X_{p-1}$ and $X_p$ is large and the difference between the summed photoelectric conversion signals $X_p$ and $X_{p+1}$ is small, so that the summed photoelectric conversion signal $X_{p+1}$ which appears after the summed photoelectric conversion signal $X_p$ may be regarded identical to the signal $X_p$ when compared to the summed photoelectric conversion signal $X_{p-1}$ that appears before $X_p$. Therefore, the chance of a pseudo color being generated is reduced when color separation is performed using more of the later summed photoelectric conversion signal $X_{p+1}$ than the signal $X_{p-1}$. In such a case, therefore, a weighing coefficient K of ¼ is selected, and the adder circuit 27 outputs $(X_{p-1})/4+(3 \cdot X_{p+1})/4$ accordingly. Hence, when the output signal $C_1$ of the first comparator 38 has logic "L" and the output signal $C_2$ of the second comparator 39 has logic "H", the decoder circuit 42 outputs the coefficient K of ¼ to the variable coefficient device 30 according to a first row of a table shown in FIG. 6.

Figure 7C:
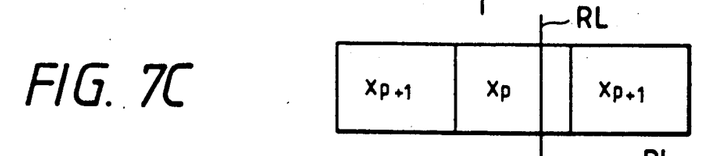

On the other hand, when the image contour RL is located somewhere between a position from about ¼ in the horizontal direction of the extracting unit $R_2$ which outputs the summed photoelectric conversion signal $X_p$ as shown in FIG. 7B and a position at about ¾ in the horizontal direction of the extracting unit $R_3$ which outputs the summed photoelectric conversion signal $X_p$ as shown in FIG. 7C, the difference between the summed photoelectric conversion signals $X_{p-1}$ and $X_p$ and the difference between the summed photoelectric conversion signals $X_p$ and $X_{p+1}$ are of the comparable order, so that the occurrence of a pseudo color will be less frequent when color separation is carried out by reflecting the earlier summed photoelectric conversion signal $X_{p-1}$ and the later summed photoelectric conversion signal $X_{p+1}$ to about the same degree. In this case, the decoder 42 outputs a weighing coefficient K of zero so that the adder circuit 27 outputs $(X_{p-1})/2+(X_{p+1})/2$. That is, when the output signal $C_1$ of the first comparator 38 has logic "L" and the output signal $C_2$ of the second comparator 39 has logic "L", the decoder 42 outputs the coefficient K of zero to the device 30 according to a second row of the table shown in FIG. 6.

Figure 7D:
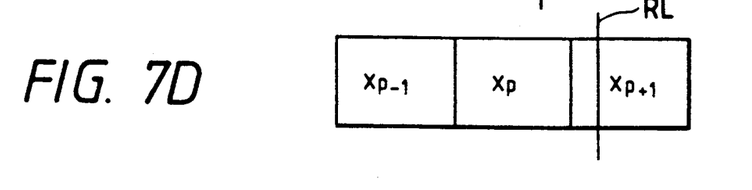

Following similar line of reasoning, when the image contour RL falls somewhere between the position shown in FIG. 7C and the position shown in FIG. 7D, the decoder 42 outputs a coefficient K of −¼ so that the adder circuit 27 outputs $(3 \cdot X_{p-1})/4+(X_{p+1})/4$. In other words, when the output signal $C_1$ of the first comparator 38 has logic "H" and the output signal $C_2$ of the second comparator 39 has logic "L", the decoder 42 outputs the coefficient K of −¼ to the device 30 according to a third row of the table shown in FIG. 6.

Further, when the image contour RL falls on a position other than those mentioned above, the summed photoelectric conversion signal $X_{p-1}$ and $X_{p+1}$ are comparable, so that the decoder 42 outputs a weighing coefficient K of zero and, therefore, the adder circuit 27 outputs $(X_{p-1})/2+(X_{p+1})/2$. That is, the output signal $C_1$ of the first comparator 38 has logic "L" and the output logic $C_2$ of the second comparator 39 has logic "L", in this case also, the decoder 42 selects a coefficient K of zero according to the second row of the table shown in FIG. 6.

As is apparent from the above description, there would be no case in which both of the output signals $C_1$ and $C_2$ have logic "H". Accordingly, it is not necessary to prepare a parameter for that case among the decoding processing.

In addition, the color separation arithmetic processing that follows the first and the second selector circuits 13 and 14 are similar to that of the first embodiment, so that further description will be omitted.

In accordance with the second embodiment of the invention, two summed photoelectric conversion signals that are apart from each other by two time units are employed for forming the signals to be processed for separating the color components. Therefore, it is possible to overcome the problems of the conventional devices associated with excessive generation of pseudo colors. Additionally, synthesis is arranged to be carried out by weighed averaging corresponding to the position of the image contour, thereby improving a quality of the picture even further when compared to the first embodiment.

In the foregoing embodiments, color component separating operation has been illustrated in conjunction with color difference sequential system in which there exist mixture of color filters of Ye, Cy, Mg and G, that is, in conjunction of color component separating operation using the summed photoelectric conversion signals from the image sensors in accordance with the field storage system of the color difference sequential system. However, the present invention can also be applied to color component separating operation of summed photoelectric conversion signals from image sensors according to the frame storage system of the color difference sequential system in which there exists color filters of Ye, Cy, Mg and G in a mixed form. In addition, it is possible to apply the present invention to an apparatus which obeys the frequency interleave system.

In short, the present invention can be applied to a color component separating apparatus in which photoelectric conversion signals having the same color components are output from alternate extracting unit regions in the horizontal direction, and color component separating operation is carried out by using two photoelectric conversion signals having different color components from each other obtained from adjacent extracting unit regions.

Further, in the foregoing embodiment there has been illustrated the case of obtaining weighed average of two photoelectric conversion signals which are apart from each other by one extracting unit region. However, the present invention may also be applied to another average weighing operation in which three photoelectric conversion signals having the same color components alternately apart from one another by one extracting unit region.

Moreover, the values of the weighing coefficient need not be limited to those in the above embodiment. In addition, the position and the direction of the image contour at which the value of the weighing coefficient is to be changed need not be limited to those positions and direction shown in the embodiment, but may be divided in a more fine step.

Still further, in the above embodiment merely one color component combination of the photoelectric conversion signal is subjected with the weighed averaging operation. However, the present invention may also be arranged to apply to the case in which another color component combination is also subjected with the weighed averaging operation.

As shown in the foregoing, in accordance with the first embodiment of the present invention, the average of photoelectric conversion signals with at least one color component combination, obtained from adjacent positions in the horizontal direction, is applied to the color separation arithmetic structure, so that it is possible to provide an apparatus which obtains color separation with less occurrences of generation of pseudo colors.

Furthermore, in accordance with the second embodiment of the present invention, photoelectric conversion signals with at least one color component combination obtained from adjacent positions in the horizontal direction are subjected to a weighed averaging operation in accordance with the positional information of the image contour, and the result of the weighed averaging operation is supplied to the color separation arithmetic structure. Therefore, it becomes possible to obtain color separation with much less chance of an occurrence of the pseudo color problem.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A color separation apparatus for outputting color components representing an optical image, the color separation apparatus comprising:
    an image sensor having read unit regions for outputting, in response to the optical image, two or more photoelectric conversion signals having different color components for one horizontal scanning line of the image sensor, said photoelectric conversion signals including a first kind having identical color components and a second kind having identical color components;
    means for reducing an influence of an image contour of said optical image being incident upon said read unit regions, said influence reducing means outputting a correction signal in response to said photoelectric conversion signals; and
    means for separating and outputting said color components contained in said photoelectric conversion signals in accordance with said correction signal.

2. The color separation apparatus of claim 1, wherein said influence reducing means comprises means for calculating an average of at least two of one of said kinds of photoelectric conversion signals from said read unit regions, said read unit regions being formed adjacent along said one horizontal scanning line, said average being output as said correction signal.

3. The color separating apparatus of claim 2, wherein said average calculating means comprises:
    first delay means for delaying by one time unit said photoelectric conversion signals output by said image sensors;
    second delay means for delaying by one time unit an output signal of said first delay means;
    means for adding said photoelectric conversion signals therefor an output of said second delay means;
    means for multiplying an output of said adding means by a factor of $\frac{1}{2}$; and
    third means for delaying by one time unit an output of said multiplying means.

4. The color separating apparatus of claim 1, wherein said influence reducing means comprises means for calculating a weighted average of at least two of one of said kinds of photoelectric conversion signals from said read unit regions, said read unit regions being formed adjacent along said one horizontal scanning line, said weighted average calculating means supplying a weighted average signal as said correction signal to said color components separating means.

5. The color separating apparatus of claim 4, further comprising means for setting a weighing coefficient in accordance with a position of said image contour on said read unit regions, said weighing coefficient being supplied to said weighted average calculating means.

6. The color separating apparatus of claim 4, wherein said weighted average calculating means comprises:
    first means for delaying by one time unit photoelectric conversion signals output by said image sensor;
    second means for delaying by one time unit an output of said first delaying means;
    third for adding said photoelectric conversion signals and an output of said second delaying means;
    fourth means for subtracting said photoelectric conversion signals by said output of said second delaying means;
    fifth means for delaying by five time units said output of said second delaying means;
    sixth means for multiplying an output of said third adding means by a factor of $\frac{1}{2}$;
    seventh means for delaying by four times units an output of said sixth multiplying means;
    eighth means for delaying by three time units an output of said fourth subtracting means;
    means for applying said weighing coefficient to an output of said eighth delaying means;
    ninth means for delaying by one time unit an output of said weighing coefficient applying means; and
    tenth means for adding an output of said seventh delaying means and an output of said ninth delaying means.

7. A color separation circuit for outputting color components i response to photoelectric conversion signals, said photoelectric conversion signals being output, in response to an optical image, from read unit regions of an image sensor arranged in a horizontal direction, the photoelectric conversion signals having different color components for one horizontal scanning line and including a first kind having identical color components and a second king having identical color components, the color separation circuit comprising:

signal averaging means for reducing an influence of an image contour of said optical image incident upon said read unit regions, said signal averaging means calculating an average result between at least two of one of said kinds of photoelectric conversion signals; and means for separating said color components contained in said photoelectric conversion signals in accordance with said average result.

8. The color separating apparatus of claim 7, wherein said average calculating means comprises:

first delay means for delaying by one time unit said photoelectric conversion signals;

second delay means for delaying by one time unit an output signal of said first delay means;

means for adding said photoelectric conversion signals therefor an output of said second delay means;

means for multiplying an output of said adding means by a factor of ½; and third means for delaying by one time unit an output of said multiplying means.

9. A color separation circuit for outputting color components in response to photoelectric conversion signals, said photoelectric conversion signals being output, in response to an optical image, from read unit regions of an image sensor arranged in a horizontal direction, the photoelectric conversion signals having different color components for one horizontal scanning line and including a first kind having identical color components and a second kind having identical color components, the color separation circuit comprising:

weighing value setting means, responsive to said photoelectric signals, for setting a weighing value in accordance with a contour position of said optical image incident upon said read unit regions;

signal weighted averaging means for calculating a weighted average result between at least two of one of said kinds of photoelectric conversion signals in accordance with said weighing value; and means for separating said color components contained in said photoelectric conversion signals in accordance with said weighted average result.

10. An apparatus as recited in claim 9, wherein said weighing value setting means sets said weighing value in accordance with said image contour position as represented by said photoelectric conversion signals.

11. A color separation apparatus for outputting color components representing an optical image, the color separation apparatus comprising:

an image sensor having read unit regions for outputting, in response to the optical image, two or more photoelectric conversion signals including a first kind components for one horizontal scanning line of the image sensor, said photoelectric conversion signals including a first kind having identical color components and a second kind having identical color components;

signal averaging means for reducing an influence of an image contour of said optical image being incident upon said read unit regions, said signal averaging means calculating an average result between at least two of one said of said kinds of photoelectric conversion signals; and means for separating said color components contained in said photoelectric conversion signals in accordance with said average result.

12. A color separation apparatus for outputting color components representing an optical image, the color separation apparatus comprising:

an image sensor having read unit regions for outputting, in response to the optical image, two or more photoelectric conversion signals having different color components for one horizontal scanning line of the image sensor, said photoelectric conversion signals including a first kind having identical color components and a second kind having identical color components;

weighing value setting means for setting a weighing value in accordance with a contour position of said optical image incident upon said read unit regions;

signal weighted averaging means for calculating a weighted average result between at least two of one of said kinds of photoelectric conversion signals in accordance with said weighing value; and means for separating said color components contained in said photoelectric conversion signals in accordance with said weighted average result.

* * * * *